United States Patent [19]
Hodges et al.

[11] Patent Number: 4,785,174
[45] Date of Patent: Nov. 15, 1988

[54] INTERFEROMETRIC THERMAL DETECTOR

[75] Inventors: Steven E. Hodges, Eugene, Oreg.; Gregory L. Tangonan, Oxnard, Calif.

[73] Assignee: Santa Barbara Research Center, Goleta, Calif.

[21] Appl. No.: 8,216

[22] Filed: Jan. 28, 1987

[51] Int. Cl.[4] .............................................. G01J 5/48
[52] U.S. Cl. .................................. 250/338.1; 250/340; 374/131
[58] Field of Search .................. 250/340, 338 R, 227; 356/345; 374/131, 161

[56] References Cited

U.S. PATENT DOCUMENTS 4,418,338  11/1983  Burt ..................................... 340/578

FOREIGN PATENT DOCUMENTS 1004935  3/1983  U.S.S.R. ............................... 356/345

OTHER PUBLICATIONS

W. Eickhoff, "Temperature Sensing by Mode-Mode Interference in Birefringent Optical Fibers", Optics Letters, vol. 6, No. 4 (Apr. 1981) pp. 204-206.

*Primary Examiner*—Janice A. Howell
*Assistant Examiner*—Constantine Hannaher
*Attorney, Agent, or Firm*—W. C. Schubert; V. G. Laslo; A. W. Karambelas

[57] ABSTRACT

An interferometric sensor (10) employs a sensing optical fiber (12) and a reference optical fiber (14). The sensing fiber (12) has a coating 16 thereon responsive to radiated thermal energy while the reference fiber is shielded therefrom. Both the sensing and reference fibers are subjected to the same ambient environment so that both fibers are subjected to heating by convection or conduction in essentially the same amounts. As a result, the sensor (10) is substantially nonresponsive to convected or conducted thermal energy while being highly responsive to radiated energy, particularly in the 6-30 micron wavelength region.

15 Claims, 2 Drawing Sheets

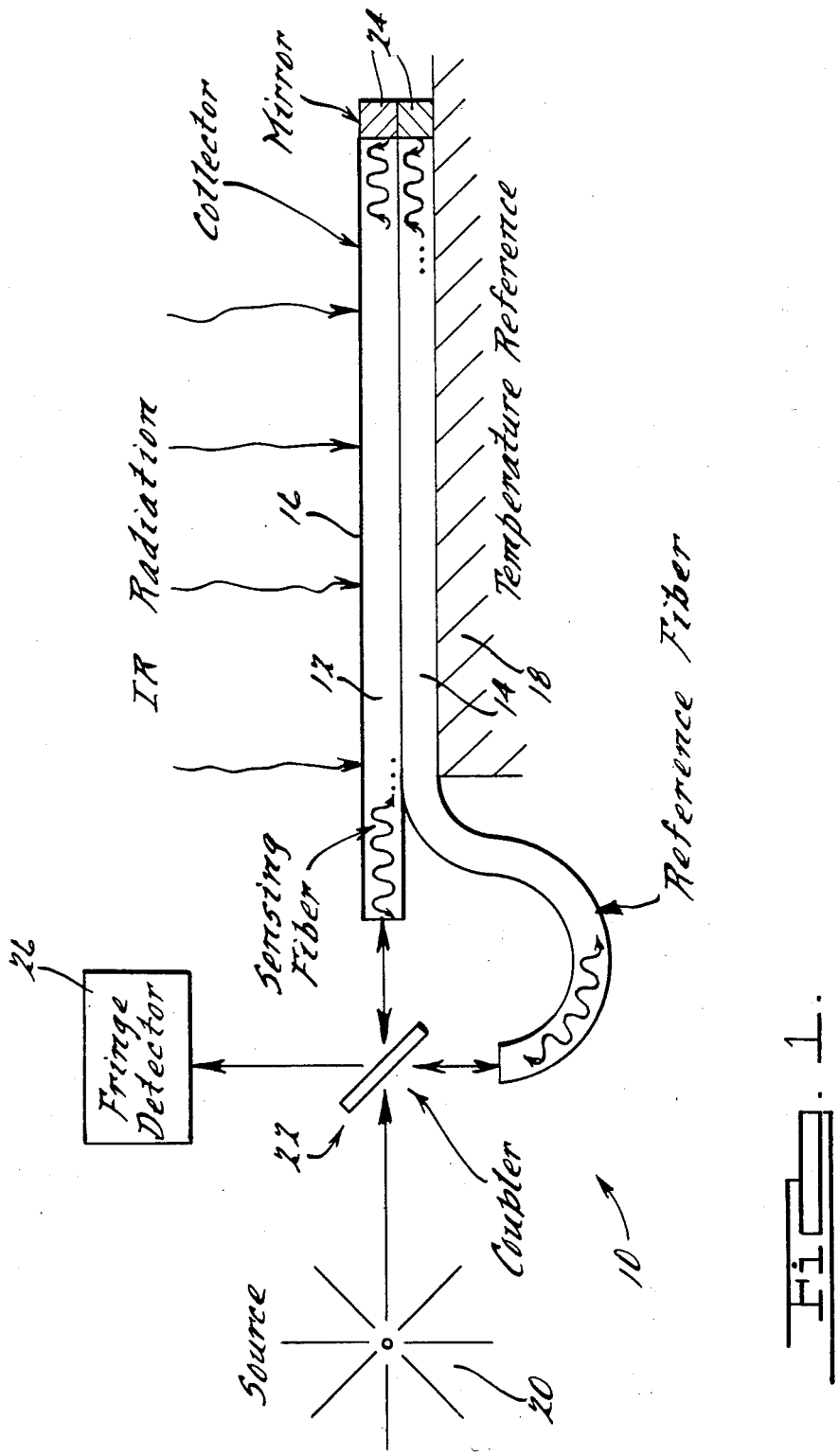

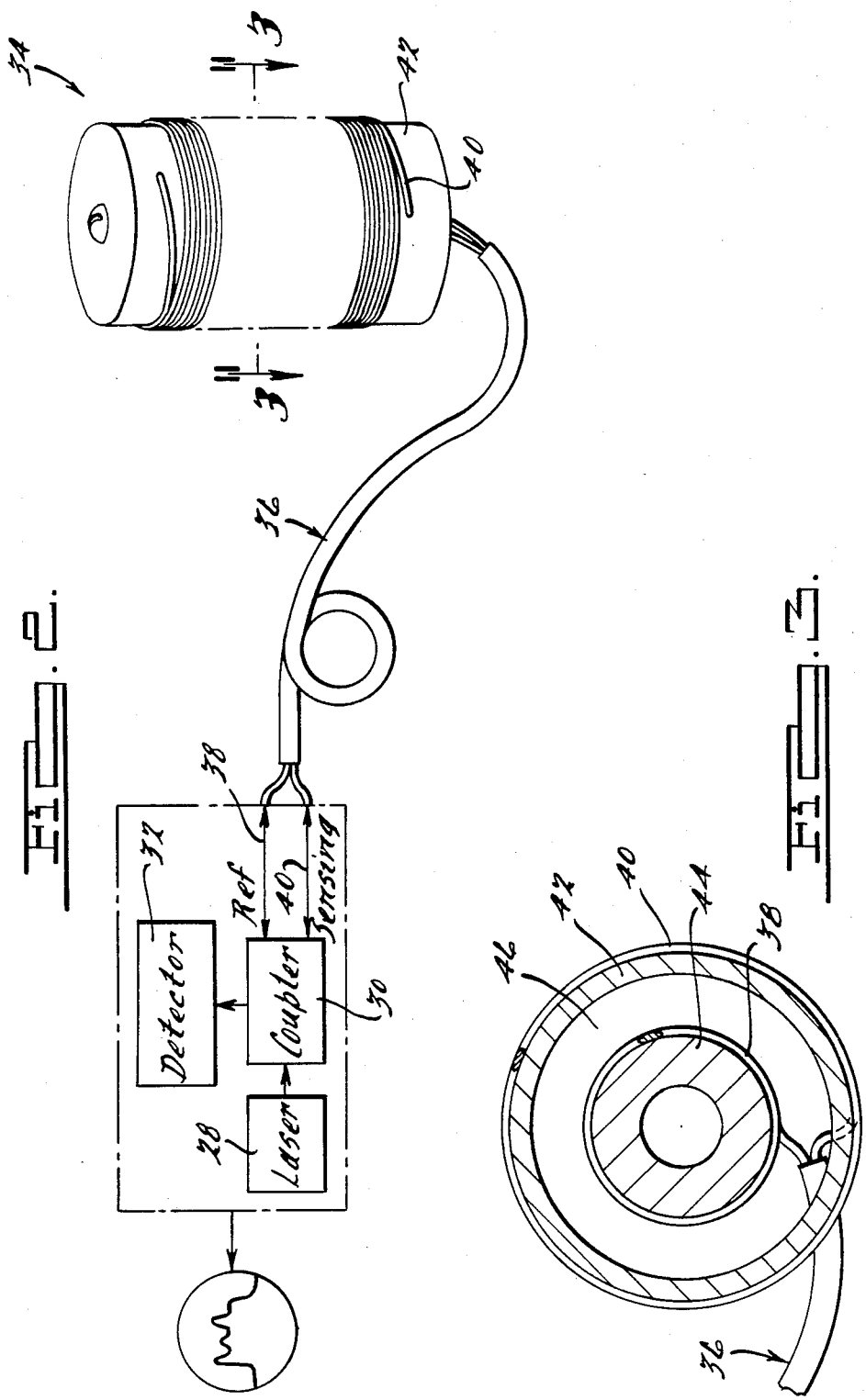

INTERFEROMETRIC THERMAL DETECTOR

BACKGROUND OF THE INVENTION

1. Technical Field

This invention relates to a method and apparatus for detecting radiated thermal energy and, more particularly, to interferometric techniques for accomplishing this function.

2. Background

Devices that sense infrared (IR) radiation having wavelengths beyond about 5 microns are generally classified as thermal or photon detectors. Photon detectors such as those made out of HgCdTe material are typically very fast and highly sensitive. Unfortunately, known photon detectors that are sensitive to wavelengths over about 5 microns usually require additional cooling apparatus to maintain them at a specific operating temperature, typically 77 degrees Kelvin. In addition, many of these known devices can be destroyed if subjected to high temperatures, such as above around 333 degrees Kelvin.

In constrast, thermal detectors such as bolometers, pyoelectric devices, Golay cells and thermo-couples are relatively slow in comparison with photon detectors. On the other hand, known thermal detectors can operate over a wider temperature range and do not need external cooling apparatus to maintain them at given temperatures. Thus, thermal detectors can generally be manufactured in relatively small, lightweight and rugged packages.

Interferometric temperature sensors using optical fibers have been described in the literature. See, for example, Corke et al., "All-Fibre Michelson Thermometer", Electronics Letters, Vol. 19, No. 13 (June 1983); Sigel Jr., "Minitutorial on Fiber Optic Sensors", presented at the Eighth Conference on Optical Fiber Communication (Feb. 13, 1985); DePaula et al., "Fiber Optic Sensor Overview", Fiber Optic and Laser Sensors III, SPIE Vol. 566 (1985); and Jackson, "Tutorial on Fiber Optic Sensors", presented at the Third International Conference on Optical Fiber Sensors (Feb. 13, 1985).

There exists a need for a detector that can accurately respond quickly to radiated IR energy in the 6-30 micron region that does not respond to conducted or convected thermal energy. One potential application is in a fire sensing and suppression system designed to respond to fires or explosions that radiate IR energy in this spectral band while not being falsely activated by conducted or convected thermal energy due to false alarm sources such as hot gas vents. The interferometric temperature sensors described above do not fulfill this need because while they are effective in sensing thermal energy in their immediate vicinity, they are relatively insensitive to radiated energy from remote sources of heat. Thus, they will not respond effectively to fires or explosions that are some distance away.

SUMMARY OF THE INVENTION

The present invention provides a method and apparatus for detecting radiated, but not conducted or convected, thermal energy in a highly responsive manner that can be utilized over a wide ambient temperature range. Preferably, the thermal detector is responsive to infrared energy in the 6-30 micron wavelength spectrum.

According to the method of this invention, a coherent light source is introduced into the proximal ends of a pair of optical fibers. One of the fibers is subjected to radiated thermal energy while the other fiber is shielded from the radiated thermal energy. The light in the two fibers are recombined and interferometrically sensed. Changes in the resulting fringe pattern due to altered characteristics of the fiber that absorbed the radiated a energy can be detected rapidly and used to indicate the presence of radiated thermal radiation in the spectral region of interest.

In a preferred construction, the reference fiber is wound around a tube located within the confines of an outer tube that carries the sensing fiber. Accordingly, the outer tube shields the reference fiber from radiated energy, though both are exposed to conducted or convected thermal energy.

BRIEF DESCRIPTION OF THE DRAWINGS

FIG. 1 is a schematic diagram that is useful in understanding the principles of the present invention;

FIG. 2 is a perspective view schematically illustrating apparatus made in accordance with the teachings of this invention; and FIG. 3 is a cross sectional view taken along the lines 3—3 of FIG. 2.

DESCRIPTION OF THE PREFERRED EMBODIMENT

FIG. 1 is a simplified view of a sensor 10 made in accordance with the present invention. The sensor includes a sensing optical fiber 12 and a reference optical fiber 14. The sensing fiber 12 is provided with a high emissivity coating 16 which is designed to absorb radiated electromagnetic energy in a particular wavelength spectrum. In the preferred embodiment, the coating 16 is designed to absorb thermal energy in the form of infrared radiation having a wavelength of between 6-30 microns. Infrared radiation in this spectral frequency band is generally radiated from a fire or explosion. Consequently, the present invention finds particular utility in applications where fires need to be reliably detected so that a fire suppressant can be activated. Of course, it is highly desirable to be able to respond as quickly as possible to actual fire conditions yet discriminate between other heat sources in the vicinity of the detector that may heat the detector by way of convection or conduction but would not be associated with a fire or explosion. For example, the sun or an engine could heat objects surrounding the sensor 10 to such a degree that the sensor 10 would be heated by convection or conduction to a very high temperature. However, this high temperature would not be associated with an explosion or fire that would necessitate activation of the fire suppressant.

In the preferred embodiment of this invention, the sensor 10 is constructed so that the reference fiber 14 is shielded from incoming radiation. The two fibers are thermally bonded so that they respond to conducted and convected energy similarly. Since the interferometer output depends on the difference in changes in the two fibers, its response will be enhanced for high frequency radiation at the expense of slower conducted and convected energy. The thermal reference 18 is used to increase the speed of the thermal detector's response; as in all thermal detectors there is a design trade off between responsivity and speed of response.

Sensor 10 includes a coherent light source such as laser diode 20 that is designed to introduce light of a given wavelength into the proximal ends of fibers 12 and 14. Preferably, this is accomplished by way of a coupler 22 that splits the beam from source 20 into two parts which are directed to the proximal ends of the fibers. The light travels down each fiber and is later optically recombined. As is well known in the art, the recombined light produces interference patterns or fringes which can be detected by suitable optically responsive devices such as an array of photodetectors which convert the fringe patterns into electrical signals for further processing. This is known as interferometric sensing and can be accomplished in a variety of different manners, well known in the art. Two of the most well known fiber optic interferometric techniques are the Mach-Zehnder interferometer and the Michelson interferometer. The details of the detection techniques are not necessary to an understanding of this invention and the reader is referred to the aforementioned papers which are hereby incorporated by reference if a more detailed understanding is desired.

The present invention is described in connection with the Michelson interferometric detection scheme since this is presently preferred. However, other techniques can be employed. To this end, the proximal ends of the fibers 12 and 14 are provided with a reflective coating represented by mirror 24. Thus, the light within the fibers are reflected back towards the source 20 where they are recombined in coupler 22 and directed towards fringe detector 26. As noted above, fringe detector 26 is any suitable optical device that is capable of detecting interference or fringe patterns created by the recombined light from the sensing and reference fibers. This detected fringe pattern will depend upon the existence and the amount of infrared radiation absorbed by the coating 16 on the sensing fiber 12. The coating 16 converts the radiated infrared radiation into heat. The heat causes the sensing fiber 12 to expand and thereby change its length and, at the same time, its refractive index. These altered characteristics in the sensing fiber 12, in turn, cause a change in the fringe pattern detected by fringe detector 26 due to a phase shift in the light passing through sensing fiber 12. The change in the fringe pattern can be rapidly detected and used, for example, to activate a fire suppressant. On the other hand, the sensor 10 does not respond to thermal energy which is conducted or convected to the sensor 10. This is because both the sensing fiber 12 and reference fiber 14 will react substantially identically to the increase (or decrease) in temperature due to conduction or convection since both fibers will be subjected to this phenomena whereas only the sensing fiber 12 is subjected to radiated energy.

FIGS. 2 and 3 illustrate a presently preferred embodiment for the sensor of the present invention. The laser source 28, coupler 30, and fringe detector 32 can all be conveniently located at a remote location from the sensor head 34. The fiber cable 36 contains at least the reference 38 and sensing 40 fibers. Cable 38 can be relatively long so that the head 34 can be spaced a considerable distance from the other devices.

Turning now to the construction of the head 34, the sensing fiber 40 is wrapped around the outer surface of an outer tube 42. An inner tube 44 is located concentrically within the confines of the outer tube 42. The reference fiber 38 is wound around the outer surface of inner tube 44. The distal ends of fibers 38 and 40 are provided with a suitable reflective mechanism compatible with the aforementioned Michelson interferometric detection technique.

The sensing fiber 40 is coated with a material, such as black paint or soot black, which is highly absorptive of infrared radiation in the 6–30 micron range. Due to the "tube within a tube" construction of this embodiment, the reference fiber 44 is shielded by way of the outer tube 42 from incident radiation. Preferably, there is a space 46 left between the reference fiber 44 and the outer tube 42 to prevent heat due to absorbed radiation from being conducted to the reference fiber 44. If desired, the space 46 can be filled with nonconductive epoxy or the like. By way of a nonlimiting example, sensor head 34 is approximately 3 centimeters in diameter and about 5 centimeters in length.

The sensor of the present invention is characterized by good sensitivity and fast response time to the presence of radiated thermal energy. It has a wide field of view and is capable of operating over a large temperature range. On the other hand, if the entire head 34 is subjected to only conducted or convected heat, then both the reference fiber 38 and sensing fiber 40 will be heated to substantially the same degree thereby altering their characteristics by about the same amount. Consequently, the sensing head 34 essentially will not respond to convected or conducted heat.

It should be understood that while this invention has been described in connection with particular examples thereof, that this is not intended by way of limitation since the skilled practitioner will realize that other variations can be made upon a study of the specification, drawing and following claims.

What is claimed is:

1. A method of detecting radiated thermal energy while being substantially unresponsive to convected or conducted thermal energy, said method comprising:
   (a) introducing a coherent light source of a given frequency into proximal ends of a sensing optical fiber and a reference optical fiber;
   (b) placing both fibers substantially in the same ambient environment so that both fibers are subjected to heating by convection or conduction in essentially the same amounts while permitting only the sensing fiber to be subjected to radiated thermal energy, the other fiber being shielded therefrom;
   (c) recombining optical signals from the fibers; and
   (d) interferometrically sensing changes in fringe patterns created by the recombined optical signals, the presence of radiated energy causing characteristics of the sensing fiber to become altered so as to change the fringe pattern.

2. The method of claim 1 wherein the sensing fiber is coated with a material that absorbs infrared radiation in the 6–30 micron range.

3. The method of claim 1 wherein the sensing fiber is wrapped around an outer surface of a tubular member, with the reference fiber being located within the member.

4. The method of claim 3 wherein the reference fiber is wrapped around a surface of an inner tube located within the confines of said member.

5. The method of claim 1 wherein distal ends of the fibers are coated with a reflective material so that the optical signals in the fibers are reflected back to the proximal ends thereof.

6. The method of claim 1 wherein the coherent light source is a laser diode.

7. Apparatus for sensing radiated thermal energy while bearing substantially nonresponsive to convected or conducted thermal energy, said apparatus comprising:
- a sensing optical fiber;
- a reference optical fiber;
- light source means for projecting coherent light into proximal ends of said reference and sensing fibers;
- absorption means for absorbing radiated thermal energy and heating said sensing fiber in response thereto so as to alter characteristics of the fiber;
- shield means for shielding the reference fiber from said radiated energy;
- housing means for locating the reference and sensing fibers in substantially the same ambient location so that each fiber can be subjected to heat by convection or conduction in substantially equal amounts; and
- interferometric means for detecting fringe patterns created by recombining optical signals in the reference and sensing fibers.

8. The apparatus of claim 7 wherein said housing means comprises:
- a tubular member having said sensing fiber wrapped around an outer surface thereof.

9. The apparatus of claim 8 wherein said housing means further comprises:
- means for locating the reference fiber within the confines of the outer tube.

10. The apparatus of claim 9 wherein said housing means further comprises:
- an inner tube located concentrically within the confines of the outer tube, with the reference fiber being wrapped around a surface of the inner tube.

11. The apparatus of claim 10 wherein said absorbing means comprises a coating on the sensing fiber having a dark color.

12. The apparatus of claim 11 wherein said coating is adapted to convert infrared radiation having a wavelength of 6-30 microns into heat.

13. The apparatus of claim 12 which further includes a cable containing at least the sensing and reference fibers, said cable being connected between said housing means on one end thereof and said light source and interferometric means on an opposite end thereof.

14. A thermal detector comprising an outer tube having a sensing optical fiber wrapped around an outer surface thereof, and an inner tube located within the confines of the outer tube and having a reference optical fiber wrapped around a surface thereof.

15. The detector of claim 14 which further comprises interferometric means for detecting characteristics of optical signals carried within said fibers.

* * * * *